United States Patent [19]

Nguyen Phuoc et al.

[11] Patent Number: 5,576,606
[45] Date of Patent: Nov. 19, 1996

[54] ASYNCHRONOUS MOTOR POWER SUPPLY CONTROL SYSTEM

[75] Inventors: Vinh T. Nguyen Phuoc, Boulogne sur Seine; Christian Conrath, Rueil Malmaison, both of France

[73] Assignee: Schneider Electric SA, Boulogne-Billancourt, France

[21] Appl. No.: 357,854

[22] Filed: Dec. 16, 1994

[30] Foreign Application Priority Data

Dec. 16, 1993 [FR] France .................. 93 15273

[51] Int. Cl.$^6$ ................................................ H02P 5/34
[52] U.S. Cl. .................. 318/801; 318/798; 318/815; 318/138; 318/254; 318/439
[58] Field of Search .................. 318/433, 434, 318/254, 138, 439, 798–815; 361/91, 15, 23; 363/41, 55, 56, 132, 136, 127, 54, 58, 128

[56] References Cited

U.S. PATENT DOCUMENTS

| | | | |
|---|---|---|---|
| 4,238,810 | 12/1980 | Stevenson et al. | 361/91 |
| 4,255,695 | 3/1981 | Plunkett et al. | 318/802 X |
| 4,427,934 | 1/1984 | Tupper | 318/798 X |
| 4,443,747 | 4/1984 | Chausse et al. | 318/809 X |
| 4,904,919 | 2/1990 | McNaughton | 318/798 |
| 5,140,248 | 8/1992 | Rowan et al. | 318/811 |
| 5,296,787 | 3/1994 | Albrecht et al. | 318/433 |

FOREIGN PATENT DOCUMENTS 0 165 020   12/1985   European Pat. Off. .

OTHER PUBLICATIONS

Patent Abstracts of Japan, vol. 10, No. 179 (E–414), Jun. 24, 1986, JP–A–61 026 496, Feb. 5, 1986.
Patent Abstracts of Japan, vol. 10, No. 46 (E–383)(2103), Feb. 22, 1986, JP–A–60 200 790, Oct. 11, 1985.
Patent Abstracts of Japan, vol. 9, No. 118 (E–316), May 23, 1985, JP–A–60 005 791, Jan. 12, 1985.

*Primary Examiner*—William M. Shoop, Jr.
*Assistant Examiner*—Karen Masih
*Attorney, Agent, or Firm*—Oblon, Spivak, McClelland, Maier & Neustadt, P.C.

[57] ABSTRACT

An asynchronous motor is supplied with power from an AC line voltage via a variable speed drive including a rectifier bridge connected to the AC line voltage, a DC voltage intermediate circuit including a capacitor, and an inverter including switches controlled by a control circuit and connected to the phase windings of the motor. A cascade regulation structure includes a frequency regulator, a current limiter and a current regulator driving the control circuit. The frequency regulator input is connected to a ramp generator supplying the motor start speed and the frequency regulator output is connected to the current limiter. The output of the current limiter is connected to the current regulator. The cascade regulation structure is associated with the intermediate circuit to limit the DC voltage at the capacitor by means of the current limiter.

20 Claims, 4 Drawing Sheets wref --, wret

Vsup --, Vbus wref --, wret

Vsup --, Vbus

ASYNCHRONOUS MOTOR POWER SUPPLY CONTROL SYSTEM

BACKGROUND OF THE INVENTION

1. Field of the invention

The present invention concerns an asynchronous motor power supply control system.

2. Description of the prior art

Asynchronous motors are usually supplied with power from an AC line voltage via a variable speed drive. The variable speed drive is a frequency converter including a rectifier bridge connected to the AC line voltage, a DC intermediate circuit including a capacitor, and an inverter with solid-state switches controlled by a pulse modulation device and connected to the phase windings of the motor.

A motor operating as a generator generates a braking torque which can be used to compensate system losses.

On braking, the motor acts as an energy recovery device and charges the capacitor of the DC circuit. The charge on the capacitor increases the DC voltage or bus voltage ($V_{bus}$) of this circuit. This voltage must not reach the maximum voltage that the capacitor and the switches are rated to withstand. The voltage is limited to a threshold voltage $V_{sup}$ by reducing the current in the motor.

In the event of a short-term interruption of the AC line voltage, the motor can be allowed to "free wheel" by turning off all the transistors, but the motor is then out of control. The loss of control over the speed makes restarting after the interruption difficult. Unless specific precautions are taken, the transient conditions when control is not optimum can cause high overcurrents. It is therefore preferable to retain control of the motor by applying braking in the event of a short-term interruption of the AC line voltage.

SUMMARY OF THE INVENTION

An object of the invention is to limit the DC voltage $V_{bus}$ of the intermediate circuit using a cascaded regulation structure so that the DC voltage does not reach the maximum voltage that the capacitor is rated to withstand.

The present invention consists in a system for controlling the supply of power to an asynchronous motor supplied with power from an AC line voltage through a variable speed drive; the variable speed driving including a rectifier bridge connected to the AC line voltage, a DC voltage intermediate circuit including a capacitor, and an inverter including switches controlled by a control circuit and connected to the phase windings of the motor, wherein:

the system includes a cascade regulation structure including a frequency regulator, a current limiter and a current regulator driving the control circuit, the frequency regulator input being connected to a ramp generator supplying a motor start speed and the frequency regulator output being connected to the current limiter, the output of the latter being connected to the current regulator;

the cascade regulation structure is associated with the intermediate circuit to limit the DC voltage at the capacitor by means of the current limiter included in said cascade regulation structure.

In the event of an interruption in the AC line voltage the regulation structure limits the DC voltage at the capacitor while the motor is operating as a generator.

The DC voltage is limited relative to a threshold voltage $V_{sup}$ dependent on the nominal AC line voltage and the maximum voltage that the capacitor is rated to withstand.

The current limiter peak limits positive and negative values of the output current of the frequency regulator.

In accordance with another feature of the invention, the peak limiter limits positive or negative values of the output current of the frequency regulator according to the sign of the speed of the motor.

In the event of an interruption in the AC line voltage, especially a very short term interruption, the regulation structure limits the DC voltage at the capacitor while the motor is operating as a generator if this DC voltage reaches a second threshold voltage $V_{sup'}$ lower than the threshold voltage $V_{sup}$.

A processor measures the DC voltage $V_{bus}$ and compares it with the threshold voltage signal $V_{sup}$ or $V_{sup'}$.

The features and advantages of the invention emerge from the following description with reference to the drawings.

DETAILED DESCRIPTION OF THE PREFERRED EMBODIMENTS

Figure 1:
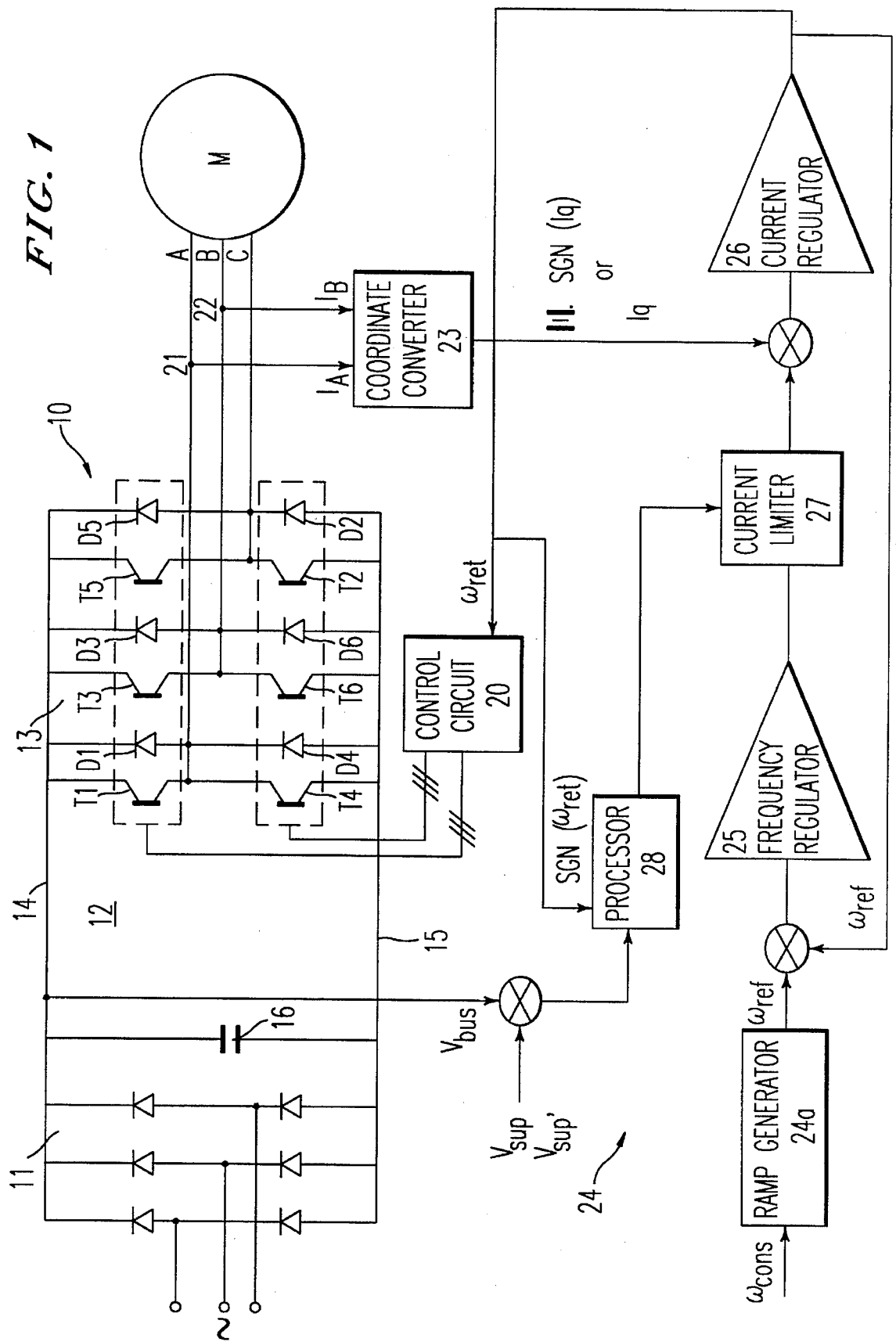
FIG. 1 is the block diagram of the system of the invention.

The system of the invention, as shown in FIG. 1, is associated with a three-phase asynchronous motor M.

The starting speed $\omega_{ref}$ of the motor is supplied by a ramp generator 24a. The ramp generator receives at its input a set point speed $\omega_{cons}$ set by the user.

The motor is supplied with power from the AC line voltage via a variable speed drive. The variable speed drive is of the frequency converter type.

The solid state frequency converter 10 shown in FIG. 1 is connected to the three-phase (or alternatively single-phase) AC line voltage. The converter is of the voltage wave type and includes a three-phase rectifier bridge 11, a DC intermediate circuit 12 and an inverter 13.

The rectifier bridge 11 includes six diodes connected to the three phases of the AC line voltage and delivers a DC voltage to the intermediate circuit 12 connected to its output.

The intermediate circuit includes respective high path and low path conductors 14, 15 between which is connected a filter capacitor 16.

The input of the inverter 13 is connected to the conductors 14, 15. Its output is connected to the phase conductors A, B, C of the asynchronous motor M.

The inverter 13 includes three pairs of solid-state switches T1, T6 in parallel with respective freewheel diodes D1, D6. Each pair of switches includes two switches T1, T4; T3, T6; T5, T2 in cascade; these switches comprise high path switches T1, T3, T5 and low path switches T4, T6, T2. The mid-point of each pair switches is connected to a respective phase winding of the motor M. A control circuit 20 turns the switches T1 through T6 on and off at chosen times.

Current reading units 21 and 22 in the form of sensors responsive to the current flowing in the various phases are provided on the phase conductors A and B. They deliver current signals $I_A$ and $I_B$ read in the fixed frame of reference (A, B, C) corresponding to the phase windings A, B and C. The current signal $I_C$ is deduced from the measured values $I_A$ and $I_B$. A co-ordinate converter 23 converters the current signals $I_A$, $I_B$ and $I_C$ into a signal $I_q$ in a frame of reference (d, q) rotating at synchronous speed, the axis d being oriented in the direction of the estimated flux of the motor. The signal $I_q$ represents the sign of the torque of the motor.

The unit 23 delivers the modulus |I| and the sign $Sgn(I_q)$ of the current $I_q$. Alternatively, it supplies $I_q$.

The system of the invention includes a cascade regulation structure 24 associated with the intermediate circuit 12 of the frequency converter. The structure includes a frequency regulator 25 followed by a current regulator 26 and a current limiter 27 between the two regulators.

Each regulator normally comprises an amplifier PI.

The frequency regulator 25 receives the frequency from the ramp generator and, as feedback, the return frequency delivered by the current regulator 26.

The current regulator 26 receives the current reference voltage from the frequency regulator and, as feedback, the current signal delivered by the unit 23. The output of the current regulator drives the control circuit 20 of the inverter.

The current reference voltage can be peak limited by a limiter 27 to protect the capacitor.

Positive values of the current reference voltage are peak limited by $I_{pos}$ and negative values are peak limited by $I_{neg}$. The peak limiting values $I_{pos}$ and $I_{neg}$ are calculated from the difference between the intermediate circuit bus voltage $V_{bus}$ and a threshold voltage $V_{sup}$.

Figure 4:
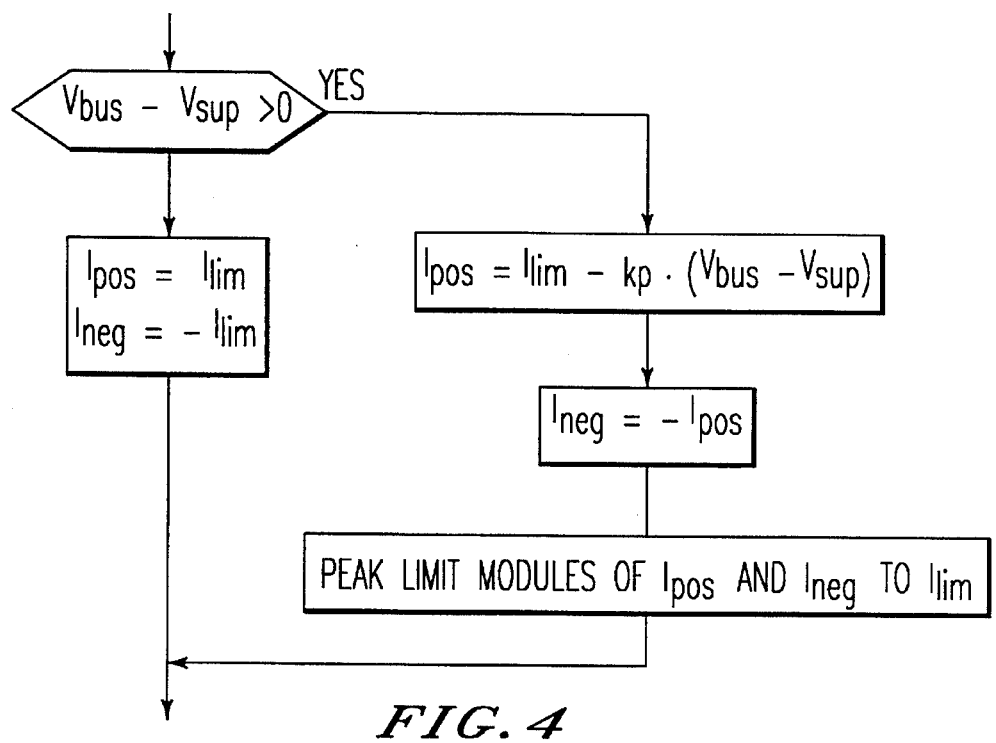
FIG. 4 shows the algorithm protecting against the maximal voltage that the capacitor is rated to withstand.

FIG. 4 shows the algorithm.

If the bus voltage does not exceed the threshold voltage $V_{sup}$ the current modulus is limited to a value $I_{lim}$.

If the bus voltage exceeds the threshold voltage $V^{sup}$ the current modulus is limited to a value less than $I_{lim}$. The correction factor used by the limiter 27 is a proportional gain kp expressed in A/V.

The system also includes a processor 28 which measures the DC voltage or bus voltage $V_{bus}$ and compares it with the threshold voltage signal $V_{sup}$. The threshold voltage depends on the nominal AC line voltage and the maximum voltage that the capacitor is rated to withstand.

In a different embodiment of the invention, the current peak limiting values are calculated from the difference between the intermediate circuit bus voltage $V_{bus}$ and a threshold voltage $V_{sup}$ and the sign of the speed $\omega_{ret}$ in order to limit only the recovered energy. Positive values or negative values are peak limited, depending on the sign of the speed, as shown by the FIG. 5 algorithm.

Figure 2:
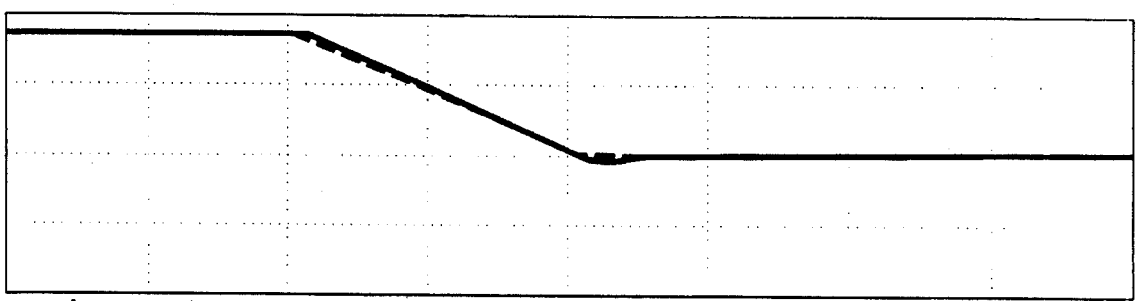
FIG. 2 simulates the braking of the motor at the nominal speed according to the ramp $\omega_{ref}$ with no bus voltage limiting.
Figure 2:
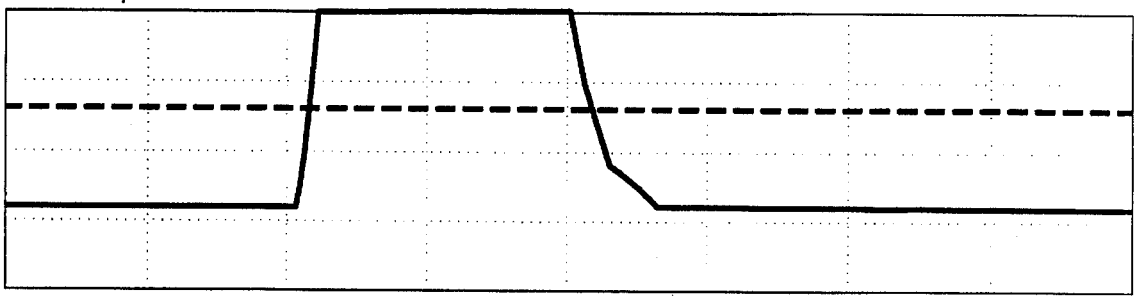

The operation of the system will now be explained:

The speed of the motor varies according to a speed ramp $\omega_{ref}$. In the event of a short-term interruption in the AC line voltage, for example, the motor is caused to decelerate by setting a lower or null set point frequency, the speed $\omega_{ret}$ decreasing along the ramp $\omega_{ref}$. Excessively fast deceleration of the motor leads to the dissipation of high levels of kinetic energy in the variable speed drive. Some of the energy produced by this deceleration is returned to the DC voltage or bus voltage intermediate circuit 12. The capacitor 16 is charged and the bus voltage increases, as shown in FIG. 2.

The voltage $V_{bus}$ must not exceed the maximum voltage which the capacitor is rated to withstand. If the bus voltage reaches a threshold voltage $V_{sup}$ detected by the processor 28, the tension is regulated so that it remains constant.

Figure 5:
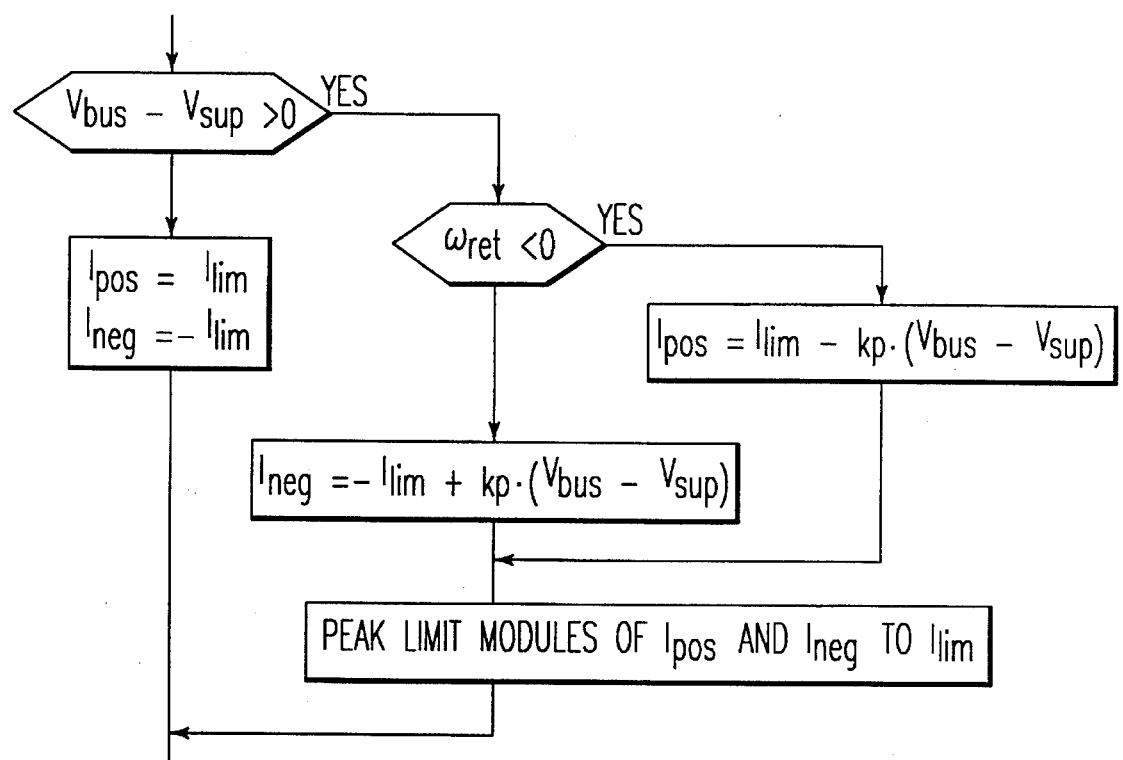
FIG. 5 shows a different embodiment of the algorithm protecting against the maximal voltage that the capacitor is rated to withstand.

Limitation is applied by peak limiting the current using the current limiter 27 which implements the algorithm shown in FIG. 4 or FIG. 5.

Figure 3:
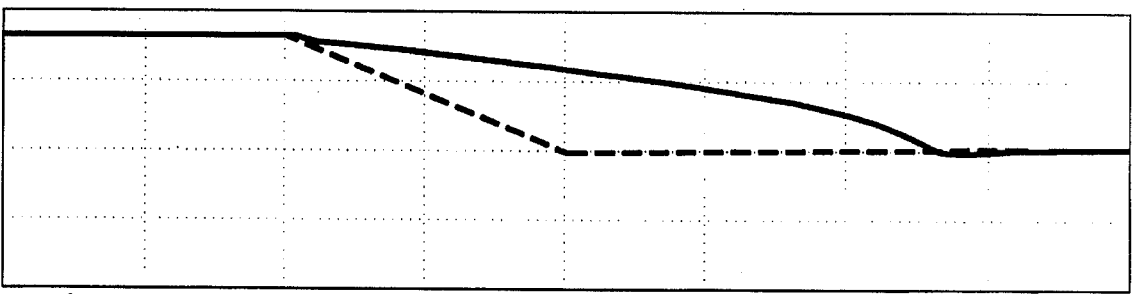
FIG. 3 simulates a deceleration departing from the initial ramp, with bus voltage limiting.
Figure 3:
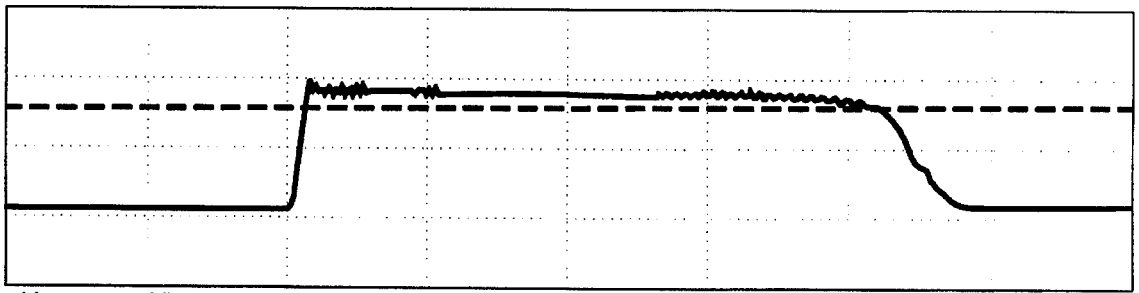

If the DC voltage $V_{bus}$ exceeds the threshold $V_{sup}$, the current limitation modifies the deceleration ramp so that the real ramp $\omega_{ret}$ departs from the initial ramp $\omega_{ref}$. FIG. 3 shows how the DC voltage $V_{bus}$ is controlled.

Figure 6:
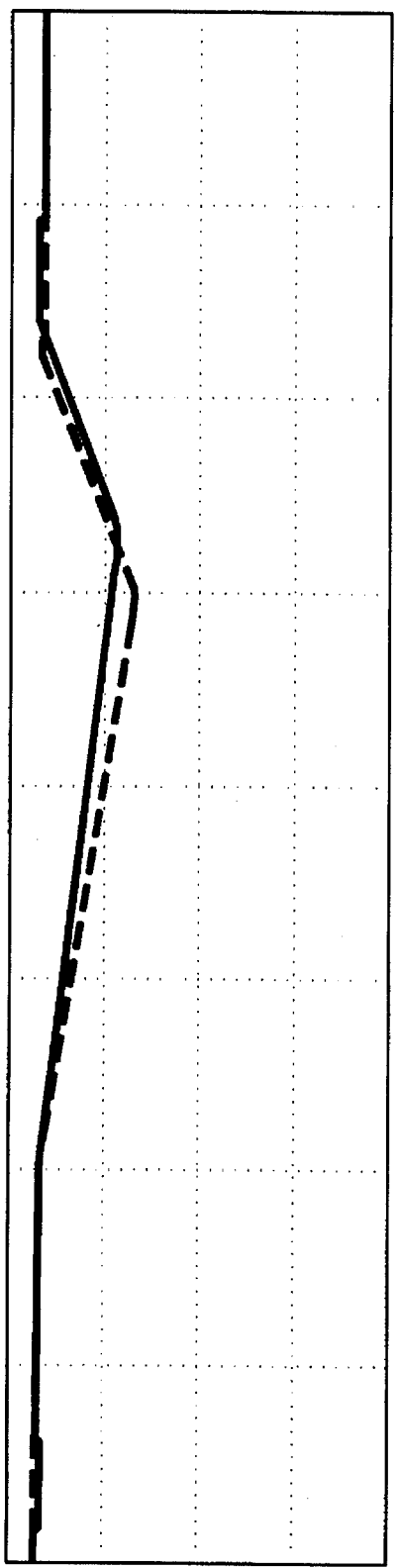
FIG. 6 simulates a short-term interruption of the AC line voltage.
Figure 6:
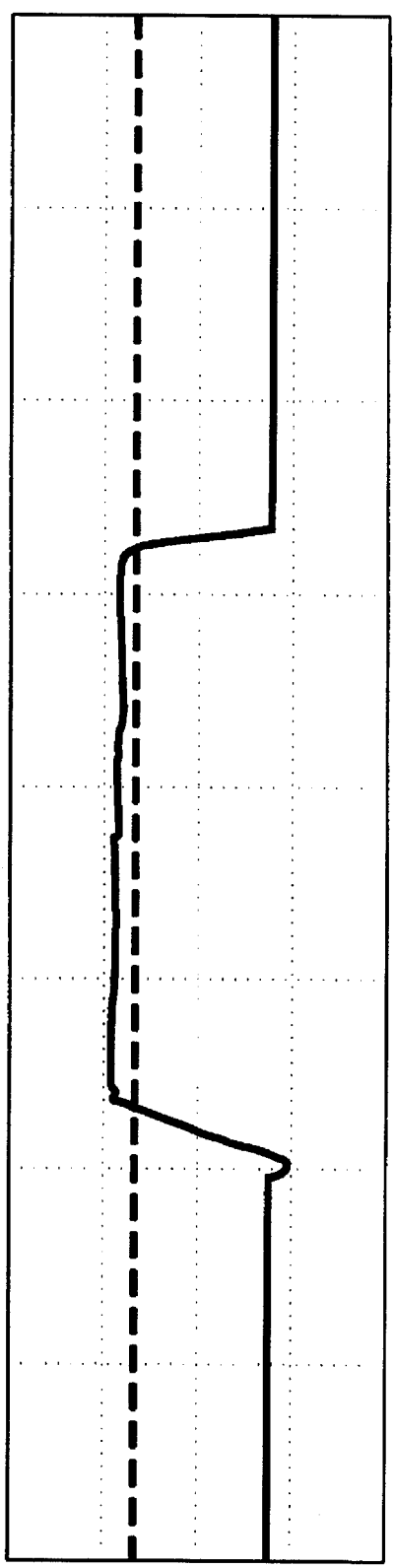

FIG. 6 simulates the specific instance of a short-term interruption of the AC line voltage with bus voltage control. When the AC line voltage reappears, the motor accelerates and the bus voltage reverts to its normal value.

In a different embodiment of the invention, in the event of a very short term interruption in the AC line voltage, the regulation structure 24 limits the DC voltage $V_{bus}$ at the capacitor 16 while the motor is operating as a generator if this DC voltage reaches a second threshold voltage $V_{sup'}$ less than the threshold voltage $V_{sup}$. This prevents unnecessary charging of the capacitor, i.e. braking of the motor at the start of the interruption.

The unit 28 compares the DC voltage with the voltage $V_{sup}$.

It is to be understood than variants of and improvements of detail to the embodiments of the invention described herein can be used without departing from the scope of the invention.

There is claimed:

1. System for controlling the supply of power to an asynchronous motor supplied with power from an AC line voltage intermediate circuit including a capacitor, and an inverter including switches controlled by a control circuit and connected to phase windings of said motor, wherein:

said system includes a cascade regulation structure including a frequency regulator, a current limiter and a current regulator driving said control circuit, said frequency regulator input being connected to a ramp generator supplying a motor start speed and said frequency regulator output being connected to said current limiter, the output of the current limiter being connected to said current regulator;

said cascade regulation structure is associated with said intermediate circuit to limit the DC voltage at said capacitor by means of said current limiter included in said cascade regulation structure when said motor is operating as a generator and wherein said DC voltage is limited relative to a threshold voltage dependent on a nominal AC line voltage and on a maximum voltage that said capacitor is rated to withstand.

2. System according to claim 1 wherein said current limiter peak limits positive and negative values of the output current of the frequency regulator.

3. System according to claim 1 wherein said current limiter peak limits positive or negative values of the output current of said frequency regulator, depending on a detected sign of the motor speed delivered by said current regulator.

4. System according to claim 1 wherein in the event of interruption of the AC line voltage, said regulation structure limits said DC voltage at said capacitor while said motor is operating as a generator if said DC voltage reaches a second threshold value less than said threshold voltage.

5. System according to claim 1 including a processor for measuring said DC voltage and comparing it with said threshold voltage signal.

6. A system for controlling a supply of power to an asynchronous motor supplied with power from an AC line voltage through a variable speed drive including a rectifier bridge connected to said AC line voltage, a DC voltage intermediate circuit including a capacitor, and an inverter including switches controlled by a control circuit and connected to phase windings of said motor, comprising:

a cascade regulation structure comprising:
   a frequency regulator;
   a current limiter; and
   a current regulator driving said control circuit;
   wherein an input of said frequency regulator is connected to a ramp generator supplying a motor start speed and an output of said frequency regulator is connected to said current limiter, the output of the current limiter being connected to said current regulator; and
   wherein said cascade regulation structure is associated with said intermediate circuit to limit a DC voltage at said capacitor by means of said current limiter included in said cascade regulation structure.

7. The system according to claim 6, wherein in an event of interruption of the AC line voltage, said cascade regulation structure limits said DC voltage at the capacitor while said motor is operating as a generator.

8. The system according to claim 6, wherein said DC voltage is limited relative to a first threshold voltage dependent on the AC line voltage and on a maximum voltage that said capacitor is rated to withstand.

9. The system according to claim 6, wherein said current limiter peak limits positive and negative values of the output current of the frequency regulator.

10. The system according to claim 6, further comprising a processor for measuring said DC voltage and comparing it with a first threshold voltage signal.

11. A system for controlling a supply of power to an asynchronous motor supplied with power from an AC line voltage through a variable speed drive including a rectifier bridge connected to said AC line voltage, a DC voltage intermediate circuit including a capacitor, and an inverter including switches controlled by a control circuit and connected to phase windings of said motor, comprising:

a cascade regulation structure comprising:
   a frequency regulator;
   a current limiter; and
   a current regulator driving said control circuit;
   wherein an input of said frequency regulator is connected to a ramp generator supplying a motor start speed and an output of said frequency regulator is connected to said current limiter, the output of the current limiter being connected to said current regulator; and
   wherein said cascade regulation structure is associated with said intermediate circuit to limit a DC voltage at said capacitor by means of said current limiter included in said cascade regulation structure;
a converter circuit connected to the phase windings of said motor for outputting a signal indicative of a sign of a speed of said motor, and wherein said current limiter peaks limits positive or negative values of an output current of said frequency regulated based on the signal indicative of the sign of the speed of said motor.

12. The system according to claim 11, wherein in an event of interruption of the AC line voltage, said cascade regulation structure limits said DC voltage at the capacitor while said motor is operating as a generator.

13. The system according to claim 11, wherein said DC voltage is limited relative to a first threshold voltage dependent on the AC line voltage and on a maximum voltage that said capacitor is rated to withstand.

14. The system according to claim 11, wherein said current limiter peak limits positive and negative values of the output current of the frequency regulator.

15. The system according to claim 11, wherein in an event of interruption of the AC line voltage, said cascade regulation structure limits said DC voltage at said capacitor while said motor is operating as a generator if said DC voltage reaches a second threshold value less than said first threshold voltage.

16. The system according to claim 11, further comprising a processor for measuring said DC voltage and comparing it with a first threshold voltage signal.

17. A system for controlling a supply of power to an asynchronous motor supplied with power from an AC line voltage through a variable speed drive including a rectifier bridge connected to said AC line voltage, a DC voltage intermediate circuit including a capacitor, and an inverter including switches controlled by a control circuit and connected to phase windings of said motor, comprising:

a cascade regulation structure comprising:
   a frequency regulator;
   a current limiter; and
   a current regulator driving said control circuit;
   wherein an input of said frequency regulator is connected to a ramp generator supplying a motor start speed and an output of said frequency regulator is connected to said current limiter, the output of the current limiter being connected to said current regulator;
   wherein said cascade regulation structure is associated with said intermediate circuit to limit a DC voltage at said capacitor by means of said current limiter included in said cascade regulation structure;
   wherein said DC voltage is limited relative to a first threshold voltage dependent on the AC line voltage and on a maximum voltage that said capacitor is rated to withstand; and
   wherein in an event of interruption of the AC line voltage, said cascade regulation structure limits said DC voltage at said capacitor while said motor is operating as a generator if said DC voltage reaches a second threshold value less than said first threshold voltage.

18. The system according to claim 17, wherein in an event of interruption of the AC line voltage, said cascade regulation structure limits said DC voltage at the capacitor while said motor is operating as a generator.

19. The system according to claim 17, wherein said current limiter peak limits positive and negative values of the output current of the frequency regulator.

20. The system according to claim 17, further comprising a processor for measuring said DC voltage and comparing it with a first threshold voltage signal.

* * * * *